United States Patent Office 3,296,226
Patented Jan. 3, 1967

3,296,226
PROCESS FOR PREPARING ACRYLONITRILE/BUTADIENE/UNSATURATED ACID TERPOLYMER WITH AN AZOBISBUTYRONITRILE/FERRIC SALT CATALYST
Robert H. McCoy, Jr., New Haven, and Richard D. Gilbert, Cheshire, Conn., assignors to United States Rubber Company, New York, N.Y., a corporation of New Jersey
Filed Aug. 28, 1964, Ser. No. 392,836
4 Claims. (Cl. 260—80.7)

This invention relates to an improvement in the emulsion polymerization of liquid rubbers. More particularly, this invention relates to the aqueous emulsion polymerization of butadiene, acrylonitrile, and acrylic acid to form a liquid rubber terpolymer, the polymerization being carried out in the presence of a minute amount of a ferric salt and an azo compound, whereby there is obtained an optimum molecular weight range for the resulting terpolymer and whereby the reaction time to reach a desired degree of conversion is decreased.

Liquid rubber terpolymers are of considerable interest, in part because of their application as non-migratory plasticizers. Liquid rubber terpolymers of butadiene, acrylonitrile, and acrylic acid are of particular interest in this regard because of their inherent oil resistance and their polymer functionality.

One desirable method of preparing of such terpolymers is by means of aqueous emulsion polymerization. Generally, such aqueous emulsion polymerization is carried out in the presence of an appropriate emulsifier, a modifier, and an initiating system.

It is an object of this invention to provide an improved method of polymerizing butadiene, acrylonitrile, and acrylic acid in aqueous emulsion to produce a liquid rubber terpolymer.

A further object is to provide a method of increasing the reaction (polymerization) rate in the aqueous emulsion polymerization of butadiene, acrylonitrile, and acrylic acid.

Another object is to provide a method whereby, at a given modifier concentration, the molecular weight of the resulting liquid terpolymer, as determined by viscosity, can be increased to an optimum range.

Figure 1:
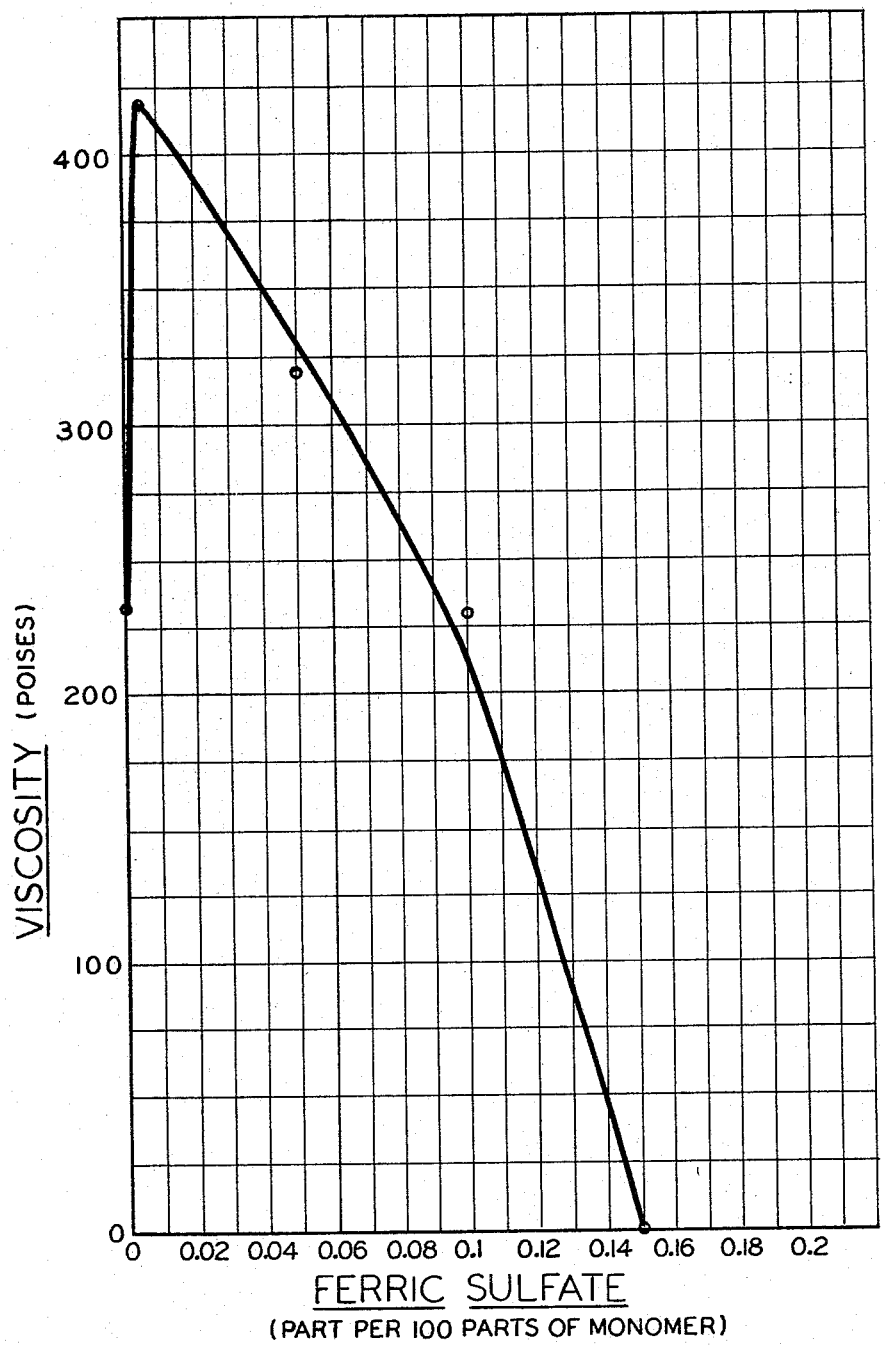
Figure 2:
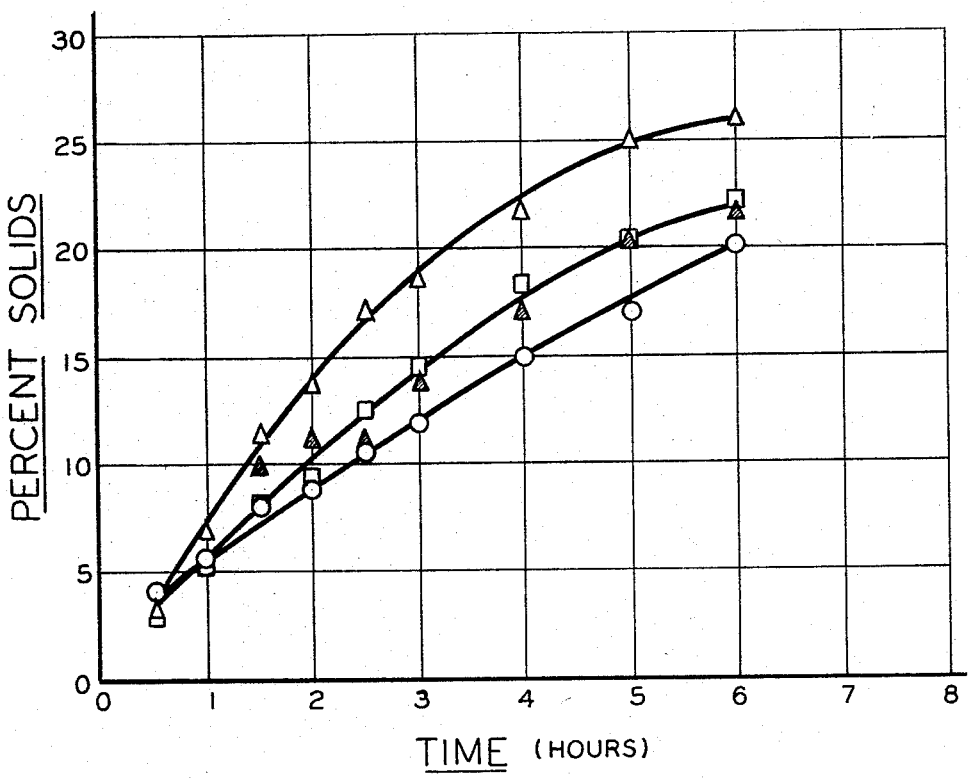
Figure 2:
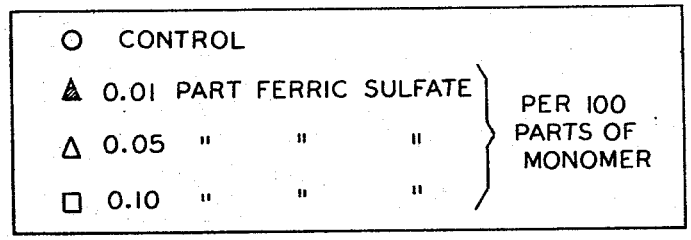

Additional objects, characteristics and advantages of our invention will become apparent from the following detailed description taken in conjunction with the accompanying drawings wherein:

FIG. 1 is a plot of the viscosity of a liquid rubber terpolymer of butadiene, acrylonitrile, and acrylic acid against ferric sulfate added to the polymerization system and FIG. 2 is a plot of the percent liquid terpolymer (Percent "Solids") against time for various amounts of ferric sulfate added to the polymerization system.

In carrying out our invention, the starting monomeric materials to be polymerized will comprise butadiene, e.g., butadiene-1,3, substituted butadienes such as, e.g., isoprene, 2,3-dimethyl-butadiene, chloro-butadiene and the like; acrylonitrile or analogues such as, e.g., methacrylonitrile; and an ethylenically unsaturated acid. Such unsaturated acid may be a monocarboxylic acid such as, e.g., acids of the general formula

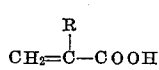

wherein R is an alkyl group having from 1 to 6 carbon atoms, acrylic and methacrylic acids being particularly desirable. Alternatively, such unsaturated acid may be dicarboxylic acid such as maleic acid, fumaric acid, itaconic acid, or the like. The proportions of starting monomers may vary from about 60 to 95 parts butadiene, from about 1 to 39 parts acrylonitrile, and from about 1 to 39 parts of unsaturated acid. A more preferred range is from about 70 to 90 parts butadiene, from about 1 to 29 parts acrylonitrile, and from about 1 to 29 parts of unsaturated acid. A particularly desirable range is from about 78 to 82 parts butadiene, from about 8 to 14 parts acrylonitrile, and from about 8 to 10 parts unsaturated acid.

The polymerization is carried out in aqueous emulsion according to conventioinal polymerization techniques.

In accordance with conventional practice, the total monomer charge is arbitrarily set at 100 parts by weight. All other constituents are expressed in parts as related to the 100 parts of monomer charge. This practice will be followed herein.

The dispersing medium, water, is generally present in an amount from about 150 to 200 parts (per 100 parts of monomer charge). Most preferred is 180 parts.

A cationic emulsifier should be employed. Suitable cationic emulsifiers include quaternary ammonium salts, such as those described in "Detergents and Emulsifiers," published by John W. McCutcheon, Inc., Morristown, New Jersey. A particularly suitable agent is cetyldimethylbenzyl ammonium chloride.

The amount of emulsifying agent employed may vary within considerable limits, and generally will be from about 2.5 to 5 parts (per 100 parts of monomer charge). A more preferred range is from about 2.5 to 3.5 parts.

The modifier or regulator as it is sometimes called, performs the important function of controlling the molecular weight of the polymer. The modifier, which is usually an aliphatic mercaptan and generally contains at least eight carbon atoms, functions as a chain transfer agent. Particularly suitable modifiers include primary-n-dodecyl mercaptan, tertiary dodecyl mercaptan, and the like, with preference being accorded primary-n-dodecyl mercaptan. In the examples hereinafter commercially available DDM was employed.

Since the rubber terpolymer product must be a liquid and not a solid, the amount of modifier employed is relatively high. Thus, in general, the amount of modifier used will be from about 5 to 12 parts (per 100 parts of monomer charge). A more preferred range is from about 6 to 8 parts.

The initiator serves to initiate or to assist in initiating the polymerization. Hence, the initiator must be capable of generating free radicals. Particularly suitable initiators are azo compounds, i.e., organic compounds containing the azo linkage, —N=N—, with particular preference being accorded azo bis(isobutyronitrile).

The amount of azo initiator employed is generally from about 0.1 to 0.5 part per 100 parts of monomers charged, a more preferred range being from about 0.2 to 0.3 part.

In accordance with one aspect of our invention, we have found that by carrying out the aqueous emulsion polymerization in the presence of a minute amount of a ferric salt, the time required to reach a desired degree of conversion is reduced. Additionally, we have found that the presence of minute amounts of the such ferric salt in the reaction media results in the obtaining of a liquid rubber terpolymer having a higher molecular weight than would result in the absence of the ferric salt.

The ferric salt must, of course, exhibit a reasonable degree of water solubility under the reaction conditions employed. Suitable salts include ferric nitrate, ferric chloride, ferric bromide, ferric phosphate, and ferric sulfate, with ferric sulfate being preferred.

The amount of ferric salt employed is critical to the success of our invention. Thus, we have found that there should be employed from about 0.001 to 0.1 part of ferric salt per 100 parts of monomers, a more preferred range being from about 0.0025 to 0.05 part.

By virtue of utilizing such ferric salt within the above specified ranges, we have found that we are able to obtain liquid rubber terpolymers having a relatively high molecular weight range at any desired concentration of modifier. Indeed, if the concentration of ferric salt, e.g., ferric sulfate, is not at least 0.001 part, it is not possible to obtain liquid polymer molecular weights within the desired range, regardless of the concentration of the modifier. However, when the ferric salt is employed as described herein, we find that we obtain liquid rubber terpolymers characterized by viscosities (Brookfield) of from about 200 to 700 poises, more desirably from about 250 to 450 poises, and most preferred, from about 300 to 350 poises.

The temperature at which the polymerization is carried out should desirably be maintained at from about 50 to 65° C. A more preferred range is from about 50 to 60° C.

The pH of the system must, of course, be below 7 because of the use of a cationic emulsifier. In general, a pH range of from about 2 to 5 is observed.

Since the polymerization reaction is highly exothermic in nature, it is necessary to provide means for heat removal for the polymerization reactor. A particularly convenient way of effecting such heat removal is by the provision of internal ammonia refrigerated cooling coils in the reactor.

In order to maintain the monomeric butadiene in liquid form it is, of course, necessary to keep the reactor under a positive pressure. Such pressure is generally maintained at from about 60 to 95 p.s.i.g.

In order to obtain liquid rubber terpolymers exhibiting the optimum molecular weight ranges referred to previously, we have found it desirable to terminate the reaction at a conversion between about 40 and 80 percent. A more preferred conversion range is from about 65 to 75 percent.

The amount of time required to carry out the polymerization will, of course, depend upon a number of factors, e.g., the degree of conversion desired, the temperature at which the polymerization is carried out, the concentrations of the various charged components, etc. In general, such reaction time will be from about 6 to 15 hours.

The degree of conversion is conveniently controlled by the addition of a shortstopping agent. Suitable shortstops include quinones such as benzoquinone, carbamates such as the potassium salt of dimethyl dithiocarbamate, but with particular preference being accorded hydroxyl ammonium sulfate. The shortstop destroys the residual catalyst and free radicals remaining and thus stops the polymerization.

The amount of shortstop added to stop the reaction is generally from about 0.15 to 2.0 parts (per 100 parts of monomer charge).

The following examples will further illustrate our invention. All parts are by weight unless otherwise stated.

*Examples 1–6*

Six emulsions were prepared, each of 80 parts of butadiene, 10 parts of acrylonitrile, and 10 parts of acrylic acid in 180 parts of water with 2.5 parts of cetyldimethylbenzyl ammonium chloride cationic emulsifier, 0.1 part of azobis (isobutyronitrile) initiator, and 7.0 parts of dodecyl mercaptan modifier. In Example 1, which served as a "control," no ferric sulfate was added. In the remaining examples, varying amounts of ferric sulfate were added, as shown in Table 1 hereinafter.

The polymerization were carried out at a temperature of 62° C. and at a positive pressure of approximately 93 p.s.i.g. Each run was sampled every half hour to determine the extent of conversion from monomer to polymer (by a solids determination, "solids" referring to liquid polymer). The runs were short-stopped at the conversions indicated in Table 1 by the addition of 0.3 part of hydroxylammonium sulfate, $(NH_2OH)_2 \cdot H_2SO_4$.

Table 1 summarizes the reaction conditions and the Brookfield viscosities exhibited by the resulting terpolymers.

TABLE 1

| Recipe | Example No. | | | | | |
|---|---|---|---|---|---|---|
| | 1 | 2 | 3 | 4 | 5 | 6 |
| Parts/100 Parts Monomers: | | | | | | |
| Butadiene | 80 | 80 | 80 | 80 | 80 | 80 |
| Acrylonitrile | 10 | 10 | 10 | 10 | 10 | 10 |
| Acrylic Acid | 10 | 10 | 10 | 10 | 10 | 10 |
| Ammonyx T at 100% [1] | 2.5 | 2.5 | 2.5 | 2.5 | 2.5 | 2.5 |
| Vazo [2] | 0.1 | 0.1 | 0.1 | 0.1 | 0.1 | [4] 0.1 |
| Dodecyl Mercaptan | 7.0 | 7.0 | 7.0 | 7.0 | 7.0 | 7.0 |
| Versene [3] | 0.2 | | | | | |
| Water | 180 | 180 | 180 | 180 | 180 | 180 |
| $Fe_2(SO_4)_3$ aq | 0.0 | 0.005 | .05 | 0.1 | 0.15 | 0.20 |
| Percent Conversion | 70 | 70 | 67 | 67 | 17 | 5 |
| Brookfield Viscosity, poise | 232 | 420 | 320 | 230 | | |

[1] Cetyldimethybenzyl ammonium chloride—25% aqueous solution.
[2] Azobis (isobutyronitrile).
[3] Tetra sodium salt of ethylene diamine tetra acetic acid. Added so as to complex and deactivate any iron present in the system as an impurity.
[4] Three boosters of 0.1 part of Vazo were added at 1, 2, and 3 hours.

The viscosity data set forth in Table 1 is also plotted in FIG. 1. It should be noted that when greater than 0.1 part of ferric sulfate was employed, the polymerization reaction could not be driven to completion, so that no data was obtained.

The marked effect of very minute amounts of ferric sulfate, e.g., as little as 0.001, upon the viscosity of the resultant terpolymer is readily apparent from a consideration of FIG. 1. Of course, the data plotted in FIG. 1 was obtained using 7.0 parts of mercaptan modifier. Accordingly, if higher viscosities are desired, e.g., of the order of 450 poises, these may readily be achieved by appropriate reduction in the amount of modifier.

*Examples 7–10*

These examples show the effect of minute amounts of ferric sulfate upon the polymerization rate. The recipe and reaction conditions are summarized in Table 2.

TABLE 2

| Recipe | Example No. | | | |
|---|---|---|---|---|
| | 7 | 8 | 9 | 10 |
| Parts/100 Monomers: | | | | |
| Butadiene | 80 | 80 | 80 | 80 |
| Acrylonitrile | 10 | 10 | 10 | 10 |
| Acrylic Acid | 10 | 10 | 10 | 10 |
| Ammonyx T at 100% | 2.5 | 2.5 | 2.5 | 2.5 |
| Vazo | .1 | .1 | .1 | .1 |
| Dodecyl Mercaptan | 7.0 | 7.0 | 7.0 | 7.0 |
| Water | 180 | 180 | 180 | 180 |
| $Fe_2(SO_4)_3$ | 0.0 | 0.01 | 0.05 | 0.10 |

All polymerizations were run at 50° C. and shortstopped with 0.3 part of hydroxylammonium sulfate.

The results are shown in FIG. 2. It is apparent that the presence of a minute amount of ferric sulfate appreciably reduces the time required to attain a desired percent conversion (as determined from percent solids).

Variations can, of course, be made without departing from the spirit of our invention.

Having thus described our invention, what we desire to secure and claim by Letters Patent is:

1. An improved method of interpolymerizing from about 60 to 95 parts by weight of a butadiene, from about 1 to 39 parts by weight of an ethylenically unsaturated acid, and from about 1 to 39 parts by weight of an acrylonitrile in aqueous emulsion to form a liquid rubber interpolymer, said polymerization being effected in the presence of a cationic emulsifier, azo bis(isobutyronitrile), a mercaptan modifier, and an inorganic, water soluble ferric salt in an amount of from about 0.001 to 0.1 part by weight per 100 parts of monomers, and short stopping said polymerization at a conversion of from about 40% to 80%.

2. The method of claim 1 in which the butadiene is butadiene-1,3, the ethylenically unsaturated acid is acrylic acid and the acrylonitrile is acrylonitrile.

3. The method of claim 1 in which the inorganic, water soluble ferric salt is ferric sulfate.

4. The method of claim 1, in which the amount of inorganic water soluble ferric salt is from about 0.0025 to about 0.05 part per 100 parts of monomers.

References Cited by the Examiner

UNITED STATES PATENTS

| | | | |
|---|---|---|---|
| 2,628,225 | 2/1953 | Tutwiler | 260—89.5 |
| 2,880,189 | 3/1959 | Miller et al. | 260—80.7 |
| 3,132,122 | 5/1964 | Dunay et al. | 260—85.5 |
| 3,226,370 | 12/1965 | Poindexter | 260—29.6 |

JOSEPH L. SCHOFFER, *Primary Examiner.*

W. HOOVER, *Assistant Examiner.*